United States Patent [19]
Huyer

[11] Patent Number: 5,633,571
[45] Date of Patent: May 27, 1997

[54] DEVICE FOR OPERATING A MOVABLE PART OF A MOTOR VEHICLE

[75] Inventor: Johannes N. Huyer, Zandvoort, Netherlands

[73] Assignee: Vermeulen-Hollandia Octrooien II B.V., RX Haarlem, Netherlands

[21] Appl. No.: 499,324

[22] Filed: Jul. 7, 1995

[30] Foreign Application Priority Data

Jul. 8, 1994 [NL] Netherlands ............... 9401134

[51] Int. Cl.$^6$ ............... H02P 3/00; B60J 7/043
[52] U.S. Cl. ............ 318/468; 318/286; 318/266; 318/466
[58] Field of Search ............ 318/260–283, 318/460–466, 445, 444, 446; 364/424.01, 424.05; 296/223, 117; 236/49.3, 1 R, 91 C; 98/2.01; 49/26, 28; 307/10.1

[56] References Cited

U.S. PATENT DOCUMENTS

| | | | |
|---|---|---|---|
| 4,240,516 | 12/1980 | Henderson et al. | 307/10.1 |
| 4,608,637 | 8/1986 | Okuyama et al. | 318/466 |
| 4,733,145 | 3/1988 | Ohashi et al. | 318/54 |
| 4,766,356 | 8/1988 | Handa et al. | 318/55 |
| 4,918,360 | 4/1990 | Tanaka et al. | 318/41 |
| 4,933,610 | 6/1990 | Memmola | 318/282 |
| 4,983,896 | 1/1991 | Sugiyama et al. | 318/286 |
| 5,054,686 | 10/1991 | Chuang | 236/49.3 |
| 5,185,562 | 2/1993 | Huyer | 318/466 |
| 5,204,592 | 4/1993 | Huyer | 318/466 |

FOREIGN PATENT DOCUMENTS

| | | |
|---|---|---|
| 2680437 | 2/1993 | France . |
| 3829405A1 | 3/1990 | Germany . |

*Primary Examiner*—Paul Ip
*Attorney, Agent, or Firm*—Westman, Champlin & Kelly, P.A.

[57] ABSTRACT

A device for operating a movable part of a motor vehicle, in particular a sliding roof, is provided with an electric motor for driving the movable part, an adjusting element for setting a desired position for the movable part, an incremental position sensor for detecting the actual position of the sliding roof, a counter in addition to the position sensor, the reading of which counter gives the actual position of the movable part, and an electronic control unit which, depending on the desired position and the counter reading, actuates the electric motor in order to move the movable part into the desired position. The control unit comprises detection means for detecting at least one limit position of the movable part, at which the movable part is unable to travel further, whereby, when said limit position is reached, the control unit resets the counter to a predetermined reading which corresponds to said limit position.

8 Claims, 2 Drawing Sheets

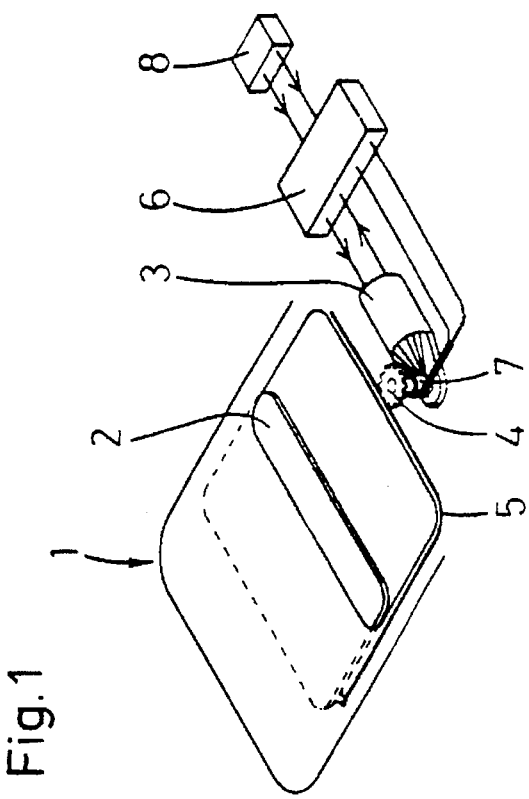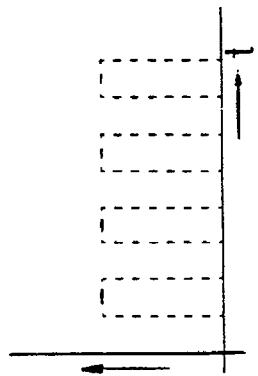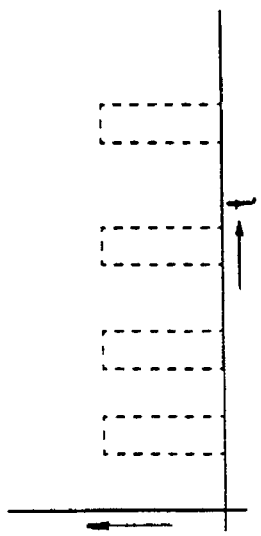

DEVICE FOR OPERATING A MOVABLE PART OF A MOTOR VEHICLE

BACKGROUND OF THE INVENTION

The invention relates to a device for operating a movable part of a motor vehicle, in particular a sliding roof, provided with an electric motor for driving the movable part, an adjusting element for setting a desired position for the movable part, an incremental position sensor for detecting the actual position of the sliding roof, a counter in addition to the position sensor, the reading of which counter gives the actual position of the movable part, and an electronic control unit which, depending on the desired position and the counter reading, actuates the electric motor in order to move the movable part into the desired position.

A device of this type is disclosed in DE-A-38 29 405. With a device of this type, errors in counting can cause the reading of the counter to differ from the actual position of the movable part, as a result of which the control unit would no longer be able to move the movable part into the desired position. In the case of said known device, this problem is overcome by adding an additional signal transmitter, which transmits a signal to the control unit when a predetermined position has been reached, with which arrangement a mechanical coupling between the position sensor and the additional signal transmitter fixes the mutual positions of said two elements. However, the costs of the known device are increased by the addition of an additional signal transmitter. Moreover, with said known device the electric motor must be accurately coupled to the movable part or the position sensor and the additional signal transmitter in order to guarantee correct control of the movable part.

SUMMARY OF THE INVENTION

The aim of the invention is to provide a simplified device of the type mentioned in the background, with which device said drawbacks are overcome in a simple manner.

To this end, the device according to the invention is characterised in that the control unit comprises detection means for detecting at least one limit position of the movable part, at which the movable part is unable to travel further, wherein, when said limit position is reached, the control unit resets the counter to a predetermined reading which corresponds to said limit position.

The invention is based on the insight that the control unit already available, which in general will comprise a microprocessor, can be made suitable in a simple manner, without the addition of additional components, for detection of at least one limit position of the movable part, at which the movable part is unable to travel further. Such a limit position exists with every movable part, such as a window, sliding roof, spoiler or tilt/slide roof. When this limit position is reached, the control unit is then able to reset the counter to a predetermined reading corresponding to said limit position. This reading will usually be the zero reading of the counter.

As a protection against jamming is usually fitted in a device of this type, it is preferable, according to the invention, that during normal operation the control unit resets the counter to the predetermined reading when the limit position is reached only if the counter of the position sensor indicates that the movable part must be in the vicinity of the limit position. By this means, a situation is prevented in which the counter would be reset to the predetermined reading in the event of the movement of the movable part being impeded by an obstacle.

According to one embodiment of the invention, detection of the limit position of the movable part is possible in that the control unit monitors the pulse signal from the position sensor, in which case the control unit resets the counter to the predetermined reading if no further pulses are received during a predetermined period.

As an alternative, the control unit monitors the motor current of the electric motor, in which case the control unit resets the counter to the predetermined reading if the motor current exceeds a predetermined threshold value.

Preferable, the said limit position is the closed position of the movable part. This embodiment has the advantage that when the movable part is unable to travel further in this limit position it is guaranteed that the movable part is also actually in the closed position.

The invention will be explained in more detail with reference to the drawing, in which two embodiments of the device according to the invention, employed in a sliding roof, are shown diagrammatically.

BRIEF DESCRIPTION OF THE DRAWINGS

FIG. 1 shows a perspective view of a first embodiment of the device according to the invention, with the roof panel of the sliding roof in an open position.

FIG. 2 shows the signal which is transmitted by the position sensor when the sliding roof is moved from the closed position into the open position shown in FIG. 1.

FIG. 3 is a perspective view corresponding to FIG. 1, where the roof panel of the sliding roof is in the vicinity of the closed position.

FIG. 4 shows the signal which is transmitted by the position sensor when the roof panel is moved into the closed position.

DESCRIPTION OF THE PREFERRED EMBODIMENTS

Figure 7:
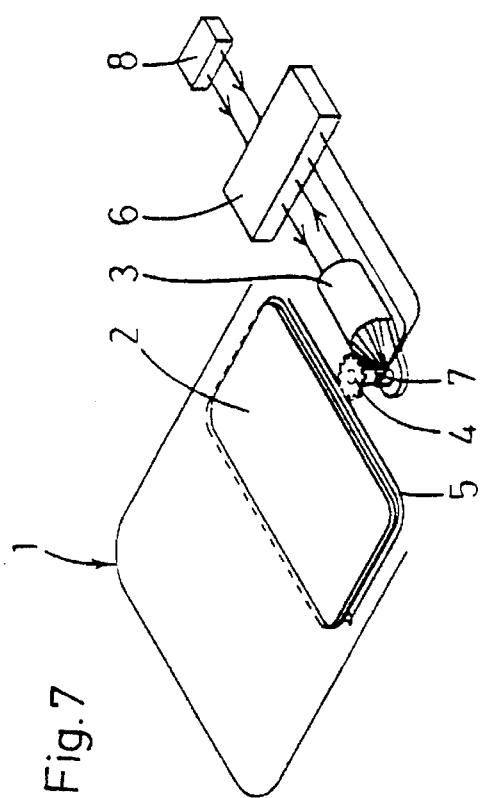
FIG. 7 is a perspective view corresponding to FIG. 5, where the roof panel is in the vicinity of the closed position.

FIG. 1 shows, highly diagrammatically, a perspective view of an illustrative embodiment of a device for operating a movable part of a motor vehicle, which part in this case is constructed as a sliding roof 1 which has a roof panel 2 which is movable backwards and forwards and can be driven by means of an electric motor 3 via a gear wheel 4 and drive cables 5, which are constructed in the conventional manner and are connected to the roof panel 2. The electric motor 3 is controlled by a control unit 6. To this end, an incremental position sensor 7 is connected to the control unit 6, which position sensor 7 transmits a pulse signal to the control unit 6. This pulse signal is counted in a count register of the control unit 6, so that the reading of the count register corresponds to the actual position of the roof panel 2. Furthermore, an adjusting element 8 is connected to the control unit 6, by means of which adjusting element 8 the user is able to set a desired position for the roof panel 2.

FIG. 2 shows the signal from the position sensor 7 which is transmitted to the control unit 6 if the roof panel 2 moves from the closed position, which is not shown, into the open position shown in FIG. 1. When a desired open position of the roof panel 2 is set using the adjusting element 8, the control unit 6 will actuate the electric motor 3 until the reading of the count register indicates an actual position of the roof panel 2 which corresponds to the set desired position. With this arrangement problems can arise because, as a consequence of malfunctions or the like, pulses are lost or false additional pulses are generated, so that the reading of the count register no longer corresponds to the actual position of the roof panel 2. The accuracy of the control would be lost as a result.

In the case of the embodiment described, this problem is overcome in that use is advantageously made of the fact that the roof panel 2 is unable to travel further when in the completely open limit position or in the closed position, which inability to travel further can be detected in a simple manner by the control unit 6. In the case of the embodiment according to FIG. 1, the inability of the roof panel 2 to travel further is detected by the control unit 6 by monitoring the occurrence of the pulses from the position sensor 7. FIG. 3 shows the situation in which the closed position has been set as the desired position using the adjusting element 8, so that the roof panel 2 is moved by the control unit 6 into the closed position. In FIG. 3 the roof panel 2 has almost reached the closed position. The pulse signal which in this case is transmitted by the position sensor 7 to the control unit 6 is shown in FIG. 4. As can be seen from FIG. 4, no further pulses will occur after the closed position is reached. If the control unit 6 has not received any further pulses from the position sensor 7 during a predetermined period, the control unit 6 switches off the electric motor 3 and resets the count register to a predetermined reading, for example the zero reading. Although it is also possible to select the fully open position as the limit position in which the control unit 6 resets the count register to the predetermined reading, the closed position is preferred since, by this means, it is reliably ensured that when the closed position is set using the adjusting element 8 the roof panel 2 will also actually reach the closed position.

It is pointed out that it can be seen in FIG. 4 that the speed of movement of the roof panel 2 usually decreases on reaching the limit position of the roof panel 2, that is to say the interval between pulses increases.

Figure 5:
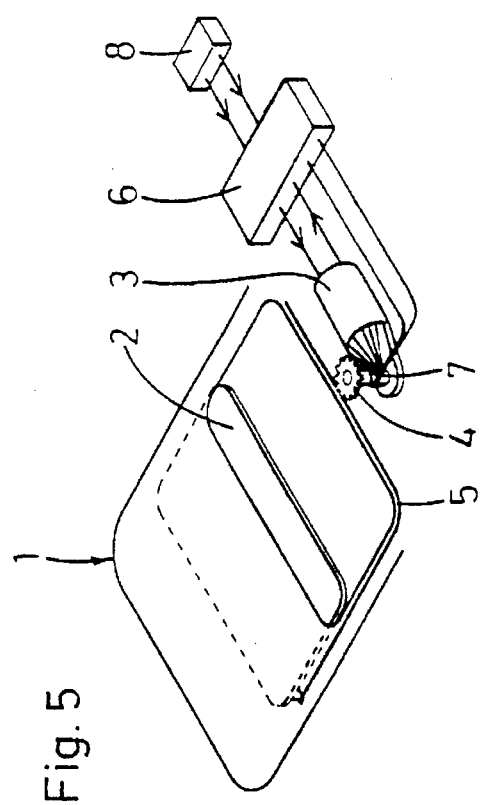
FIG. 5 is a perspective view of a second embodiment of the device according to the invention, with the roof panel of the sliding roof in an open position.
Figure 6:
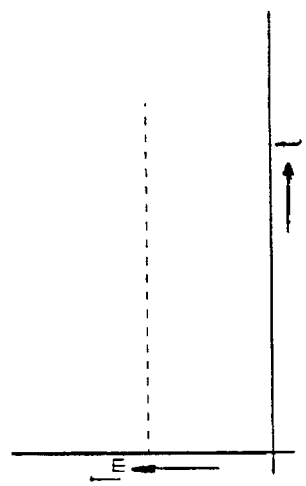
FIG. 6 shows the motor current of the electric motor when the roof panel is moved from the closed position into the open position according to FIG. 5.

A second embodiment of the device according to the invention is shown in FIGS. 5 and 7, with which embodiment the control unit 6 monitors the motor current of the electric motor 3 in order to detect the limit position of the roof panel 2. Corresponding components are indicated by the same reference numerals as used in FIGS. 1 and 3. In FIG. 5 the roof panel 2 has been moved into an open position, and FIG. 6 shows the motor current $I_m$ of the electric motor 3 which will be drawn during such a movement. As can be seen from FIG. 6, this motor current will be virtually constant. After setting a desired position using the adjusting element 8, the control unit 6 will move the roof panel 2 again until the reading of the count register indicates an actual position which corresponds to the set desired position.

Figure 8:
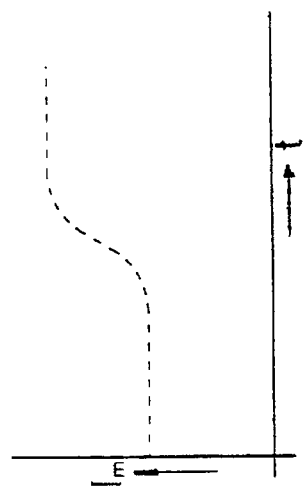
FIG. 8 shows the motor current of the electric motor which will prevail when the closed position is reached.

FIG. 7 shows the roof panel 2 when it has been moved into the closed position, and FIG. 8 shows the motor current which will be drawn when the closed position is reached.

This motor current is monitored by the control unit 6 and when, at time T, the motor current $I_m$ exceeds a predetermined threshold value, the control unit 6 switches off the electric motor 3 and resets the count register to the predetermined reading.

It will be clear from the above that the device described makes advantageous use of the fact that the roof panel 2 has at least one limit position, at which the roof panel is unable to travel further. This inability of the roof panel 2 to travel further can be detected in a simple manner by the control unit 6 without supplementary components, so that, when said limit position is reached, the control unit 6 is able to reset the count register to a reading which corresponds to said limit position.

Although in the embodiments described the device is used for operating a sliding roof, the device described can also be used for operating other movable parts of a motor vehicle, such as a spoiler, a tilt/slide roof or a window.

Furthermore, it is pointed out that the control unit 6 can also carry out other control functions. It is, for example, possible to implement a protection against jamming with the aid of the detection means described, so that the control unit 6 switches off or actuates the electric motor 3 in order to move the roof panel 2 into the fully opened position if the pulse signal from the position sensor or the motor current $I_m$ indicates that the roof panel 2 is impeded by an obstacle. In order, in this case, to prevent a situation in which the control unit 6 would also reset the count register to the predetermined reading, the control unit 6 is designed in such a way that, during normal operation, resetting of the count register is carried out only if the reading of the count register indicates that the roof panel 2 is in the vicinity of the limit position, which in this case is the closed position.

The invention is not restricted to the illustrative embodiments described above, which can be varied in different ways within the scope of the claims.

I claim:

1. A device for operating a movable part of a motor vehicle comprising an electric motor for driving the movable part, an adjusting element for setting a desired position for the movable part, an incremental position sensor for detecting the actual position of the moveable part, a counter operably coupled to the position sensor, the counter providing an output indicative of the actual position of the movable part, and an electronic control unit operably coupled to the adjusting element, the counter and the motor, the electronic control unit actuating the electric motor in order to move the movable part into the desired position, wherein the control unit comprises detection means for detecting at least one limit position of the movable part, at which the movable part is unable to travel further, wherein, when said limit position is reached, the control unit resets the counter to a predetermined reading which corresponds to said limit position.

2. The device according to claim 1, wherein during normal operation the control unit resets the counter to the predetermined reading when the limit position is reached only if the counter of the position sensor indicates that the movable part must be in the vicinity of the limit position.

3. The device according to claim 1 wherein the control unit monitors a pulse signal from the position sensor, in which case the control unit resets the counter to the predetermined reading if no further pulses are received during a predetermined period.

4. The device according to claim 1 wherein the control unit monitors a motor current of the electric motor, in which case the control unit resets the counter to the predetermined reading if the motor current exceeds a predetermined threshold value.

5. The device according to claim 1 wherein the said limit position is a closed position of the movable part.

6. The device according to claim 2 wherein the control unit monitors a pulse signal from the position sensor, in which case the control unit resets the counter to the predetermined reading if no further pulses are received during a predetermined period.

7. The device according to claim 2 wherein the control unit monitors a motor current of the electric motor, in which case the control unit resets the counter to the predetermined reading if the motor current exceeds a predetermined threshold value.

8. The device according to claim 2 wherein the said limit position is a closed position of the movable part.

\* \* \* \* \*